United States Patent
Watari et al.

(10) Patent No.: US 11,374,468 B2
(45) Date of Patent: Jun. 28, 2022

(54) ROTATING ELECTRIC MACHINE

(71) Applicant: HITACHI AUTOMOTIVE SYSTEMS, LTD., Hitachinaka (JP)

(72) Inventors: Shinjirou Watari, Hitachinaka (JP); Shinji Yamazaki, Hitachinaka (JP); Tomohiro Fukuda, Hitachinaka (JP); Mohdbasir Zulaika, Hitachinaka (JP)

(73) Assignee: HITACHI ASTEMO, LTD., Ibaraki (JP)

(*) Notice: Subject to any disclaimer, the term of this patent is extended or adjusted under 35 U.S.C. 154(b) by 114 days.

(21) Appl. No.: 16/763,413

(22) PCT Filed: Oct. 29, 2018

(86) PCT No.: PCT/JP2018/040037
§ 371 (c)(1),
(2) Date: May 12, 2020

(87) PCT Pub. No.: WO2019/097992
PCT Pub. Date: May 23, 2019

(65) Prior Publication Data
US 2021/0075299 A1 Mar. 11, 2021

(30) Foreign Application Priority Data
Nov. 15, 2017 (JP) .............................. JP2017-220462

(51) Int. Cl.
*H02K 11/25* (2016.01)
*H02K 11/00* (2016.01)
*H02K 3/52* (2006.01)

(52) U.S. Cl.
CPC ............. *H02K 11/25* (2016.01); *H02K 3/522* (2013.01); *H02K 11/00* (2013.01); *H02K 2203/06* (2013.01)

(58) Field of Classification Search
CPC .... H02K 3/522; H02K 11/25; H02K 2203/06; H02K 11/00; H02K 3/00; H02K 3/02;
(Continued)

(56) References Cited

U.S. PATENT DOCUMENTS

| 6,028,382 A | * | 2/2000 | Blalock | ................. H02K 11/25 310/68 C |
| 7,033,073 B2 | * | 4/2006 | Hoppe | ..................... G01K 5/48 361/25 |

(Continued)

FOREIGN PATENT DOCUMENTS

| JP | 2010-252508 A | 11/2010 |
| JP | 2012-098204 A | 5/2012 |

(Continued)

OTHER PUBLICATIONS

Shibuya et al, Rotary Electric Machine, Yaskawa Electric Corp, JP 2012249438 (English Machine Translation) (Year: 2012).*
(Continued)

*Primary Examiner* — Quyen P Leung
*Assistant Examiner* — Alexander A Singh
(74) *Attorney, Agent, or Firm* — Volpe Koenig

(57) ABSTRACT

Workability during attachment of a sensor element to a rotating electric machine is improved. A semiconductor element functioning as a sensor element for detecting temperatures of concentrated winding coils is inserted between two concentrated winding coils adjacent to each other in a plurality of the concentrated winding coils. One end of a lead wire is connected to the semiconductor element, while the other end of the lead wire is drawn out of a stator. The lead wire has a plurality of bent portions. A hook regulates an extending direction of the lead wire drawn out of the stator such that a bent state of the bent portions of the lead wire is maintained.

8 Claims, 7 Drawing Sheets

(58) Field of Classification Search
CPC .. H02K 3/04; H02K 3/12; H02K 3/18; H02K 3/22; H02K 3/28; H02K 3/38; H02K 3/50; H02K 3/52; H02K 5/225
USPC .................................................. 310/68 C, 71
See application file for complete search history.

(56) References Cited

U.S. PATENT DOCUMENTS

| | | |
|---|---|---|
| 9,735,659 B2 * | 8/2017 | Koizumi ................. H02K 3/48 |
| 2009/0140614 A1 | 6/2009 | Heim |
| 2012/0112580 A1 | 5/2012 | Sato et al. |
| 2013/0320817 A1 | 12/2013 | Marschall |
| 2016/0094102 A1 | 3/2016 | Hoshina |

FOREIGN PATENT DOCUMENTS

| | | | |
|---|---|---|---|
| JP | 2012-249438 A | | 12/2012 |
| JP | 2012249438 A | * | 12/2012 |
| JP | 2016-073083 A | | 5/2016 |

OTHER PUBLICATIONS

International Search Report, PCT/JP2018/040037, dated Jan. 15, 2019, 1 pg.

\* cited by examiner

A—A CROSS-SECTIONAL VIEW

B—B CROSS-SECTIONAL VIEW

ROTATING ELECTRIC MACHINE

TECHNICAL FIELD

The present invention relates to a rotating electric machine.

BACKGROUND ART

There is a known technology which detects a temperature of a stator coil of a rotating electric machine by using a sensor element, such as a thermistor, attached to the rotating electric machine. Concerning attachment of such a sensor element, PTL 1 discloses a stator which is included in a rotating electric machine, and has a snap piece for holding sensor wiring connected to a thermistor element in a container-shaped resin box which accommodates a connection portion of a stator coil.

CITATION LIST

Patent Literature

PTL 1: JP 2012-98204 A

SUMMARY OF INVENTION

Technical Problem

According to the attachment method described in PTL 1, the sensor wiring needs to be pressed into the snap piece and fixed thereto at the time of attachment of the thermistor to the rotating electric machine. This method therefore still has room for improvement in workability.

Solution to Problem

A rotating electric machine according to the present invention includes: a rotor; a stator that includes a plurality of coils; a sensor element that detects temperatures of the coils; a lead wire connected to the sensor element; and a guide mechanism that regulates an extension direction of the lead wire. The sensor element is inserted between two adjacent coils of the plurality of coils. One end of the lead wire is connected to the sensor element. The other end of the lead wire is drawn out of the stator. The lead wire has a plurality of bent portions. The guide mechanism regulates the extension direction of the lead wire drawn out of the stator such that a bent state of the bent portions of the lead wire is maintained.

Advantageous Effects of Invention

According to the present invention, workability at the time of attachment of a sensor element to a rotating electric machine can improve.

DESCRIPTION OF EMBODIMENT

One embodiment of the present invention will be hereinafter described with reference to the drawings.

Figure 1:
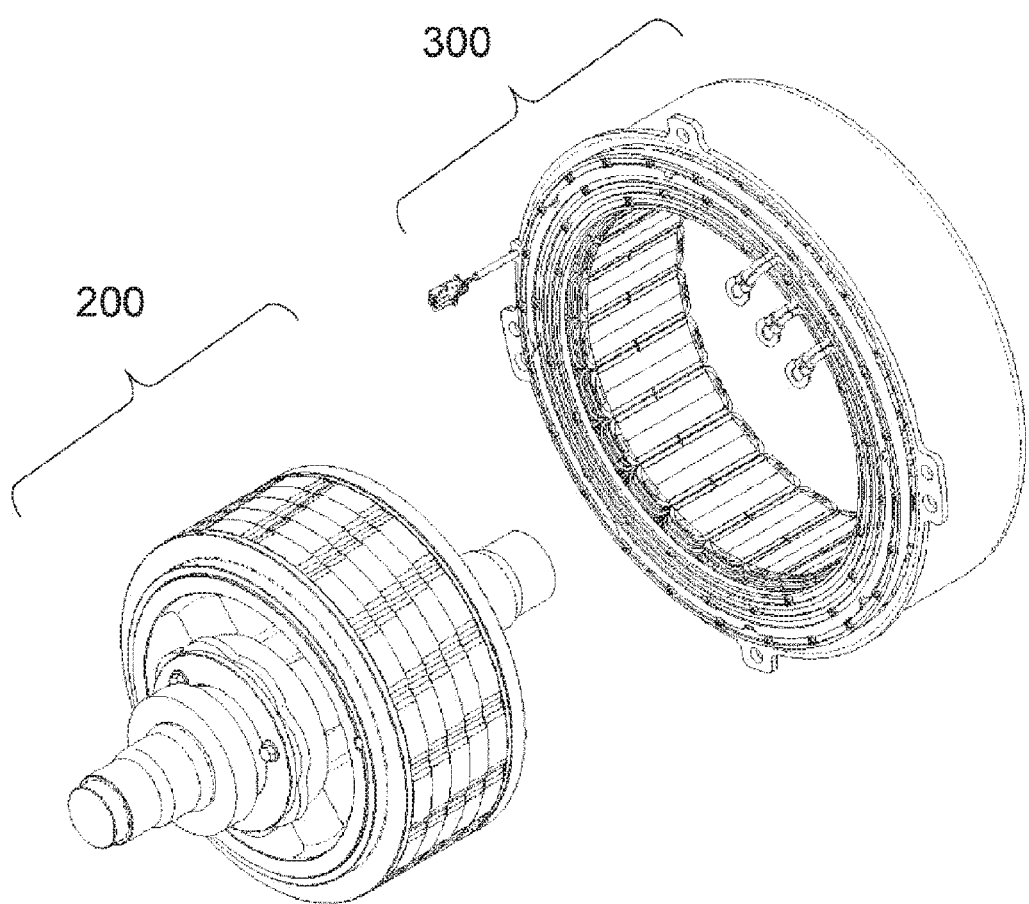
FIG. 1 is an exploded view of a rotating electric machine according to one embodiment of the present invention.

FIG. 1 is an exploded view of a rotating electric machine 100 according to the one embodiment of the present invention. The rotating electric machine 100 shown in FIG. 1 is constituted by a rotor 200 and a stator 300. For example, the rotating electric machine 100 is used as a generator or a driving motor of an automobile. It has been demanded to increase output from these motors, wherefore a temperature environment for components has been severe in accordance with the increase in the output.

The rotor 200, which functions as a rotor, is disposed inside the stator 300, and driven to rotate around a rotation axis. The rotor 200 has a built-in permanent magnet, and is skewed.

The stator 300, which functions as a stator, is constituted by a combination of a plurality of split cores. Each of the cores of the stator 300 includes a coil constituted by a winding. A plurality of coils are thus formed on the stator 300.

Figure 2:
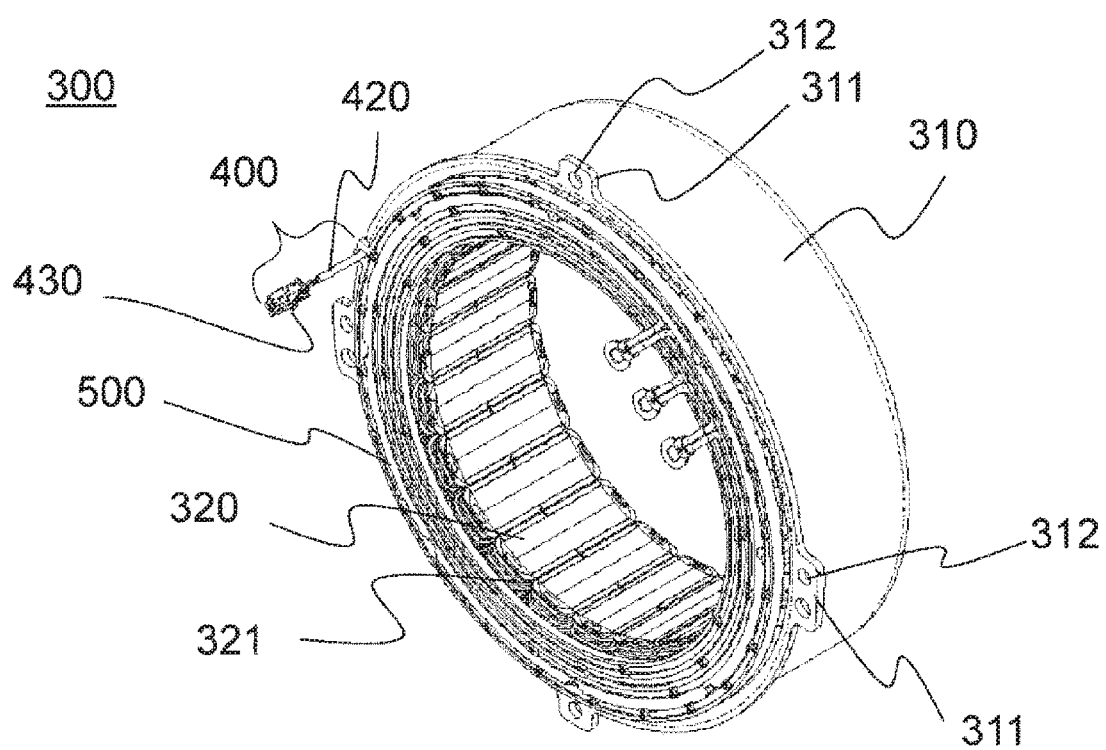
FIG. 2 is an external view of a stator included in the rotating electric machine according to the one embodiment of the present invention.

FIG. 2 is an external view of the stator 300 included in the rotating electric machine 100 according to the one embodiment of the present invention. The stator 300 includes a concentrated winding stator 320 disposed in a housing 310 having a cylindrical shape. A plurality of tabs 311 each having a through hole 312 are provided on an outer circumferential portion of the housing 310.

The stator 300 is fixed to a vehicle by using fastening members, such as bolts, which penetrate the through holes 312 of the tabs 311 and are fastened to a transmission case or the like of the vehicle. The concentrated winding stator 320 is constituted by a plurality of concentrated winding coils 321 which are annularly assembled. A connection plate 500 for connecting the concentrated winding coils 321 to each other is disposed on one end side of the stator 300. Note that the connection plate 500 also functions as a cover member which covers the axial one end side of the concentrated winding stator 320.

A thermistor 400 for detecting temperatures of the concentrated winding coils 321 is attached to the stator 300. The thermistor 400 is inserted and disposed between the two concentrated winding coils 321 adjacent to each other in the plurality of concentrated winding coils 321 constituting the concentrated winding stator 320. The thermistor 400 includes a semiconductor element 410 (see FIG. 6) disposed inside the stator 300 and functioning as a sensor element for detecting the temperatures of the concentrated winding coils 321, a lead wire 420 extending from an inside of the stator 300, passing between the connection plate 500 and the concentrated winding stator 320, and drawn to the outside, and a connector 430 provided at an end of the lead wire 420 on the side opposite to the side where the semiconductor element 410 is connected. An external circuit (not shown) is connected to connector 430 when the rotating electric machine 100 is mounted on the vehicle.

Figure 3:
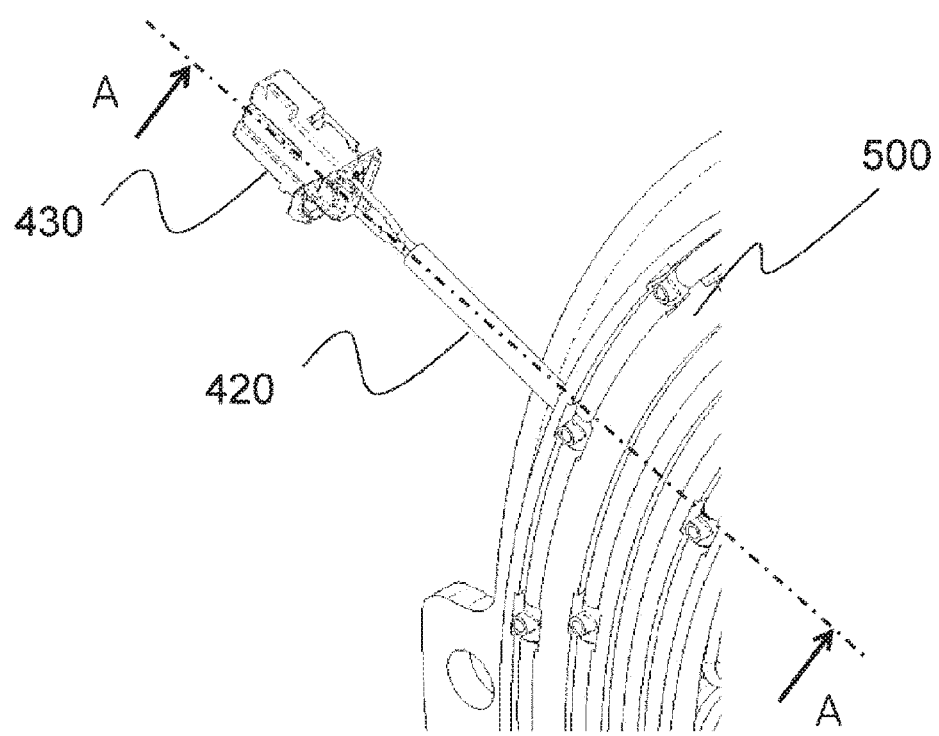
FIG. 3 is a view showing an attachment structure of a thermistor according to a comparative example.
Figure 4:
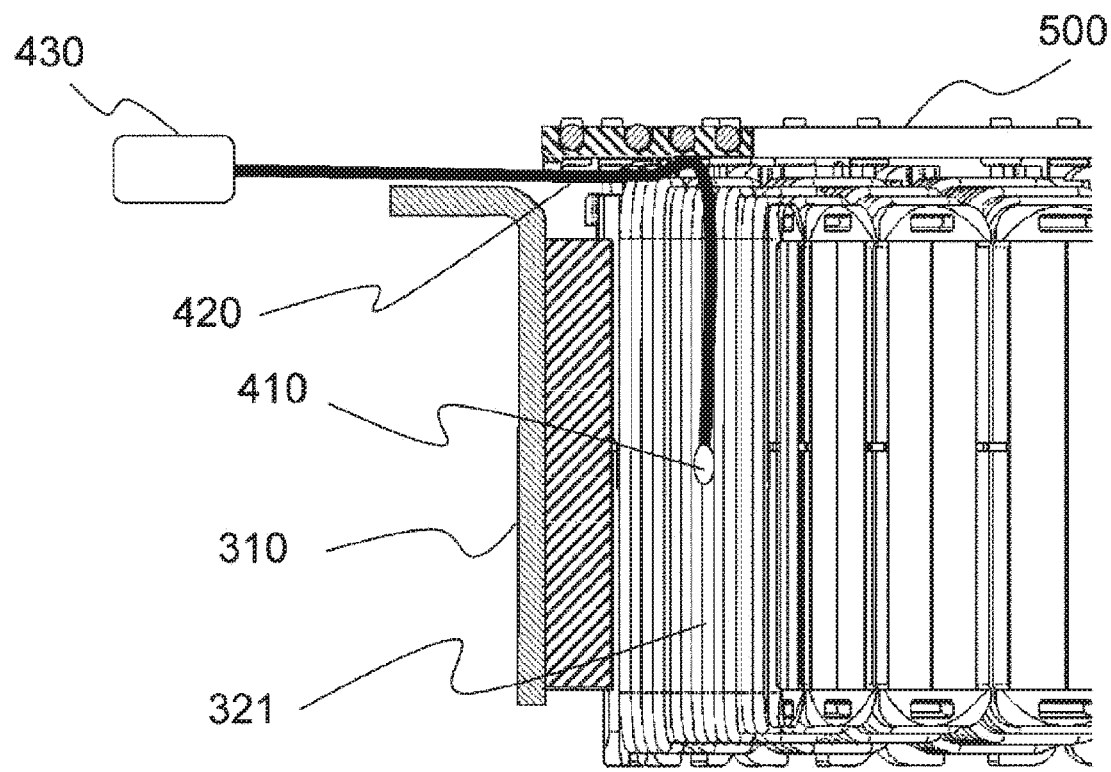
FIG. 4 is a view showing the attachment structure of the thermistor according to the comparative example.

Next, a comparative example of the present invention will be described with reference to FIGS. 3 and 4. FIGS. 3 and 4 are views each showing an attachment structure of the thermistor 400 according to the comparative example. Note that FIG. 4 is a cross-sectional view taken along a line A-A of FIG. 3.

In the comparative example shown in FIGS. 3 and 4, the lead wire 420 extending in an axial direction of the stator 300 from the semiconductor element 410 is bent toward the outer circumferential side of the stator 300 in front of the connection plate 500. The bent lead wire 420 extends in a radial direction of the stator 300, passes between the connection plate 500 and axial ends of the concentrated winding coils 321, and is drawn out of the stator 300. Note that a resistance value of the semiconductor element 410 changes in accordance with an ambient temperature. The semiconductor element 410 is inserted and disposed between the two concentrated winding coils 321 to detect the temperatures of the concentrated winding coils 321.

According to the above comparative example, the lead wire 420 connected to the connector 430 is pulled in the radial direction when the connector 430 engages with a connector of an external circuit. In this case, a force may be applied in a direction where the semiconductor element 410 is pulled out from the position between the concentrated winding coils 321, i.e., applied to the semiconductor element 410 in an upward direction in FIG. 4. The semiconductor element 410 herein is inserted and disposed between the two concentrated winding coils 321, but is not fixed to a certain position without movement. Therefore, a situation of separation of the thermistor 400 from the stator 300 may be caused as a result of pull-out of the semiconductor element 410.

According to the rotating electric machine 100 of the one embodiment of the present invention, therefore, the lead wire 420 is bent a plurality of times to maintain the bent state and thereby prevent separation of the thermistor 400 from the stator 300 even if the lead wire 420 is pulled. The one embodiment of the present invention will be hereinafter described with reference to FIGS. 5, 6, and 7.

Figure 5:
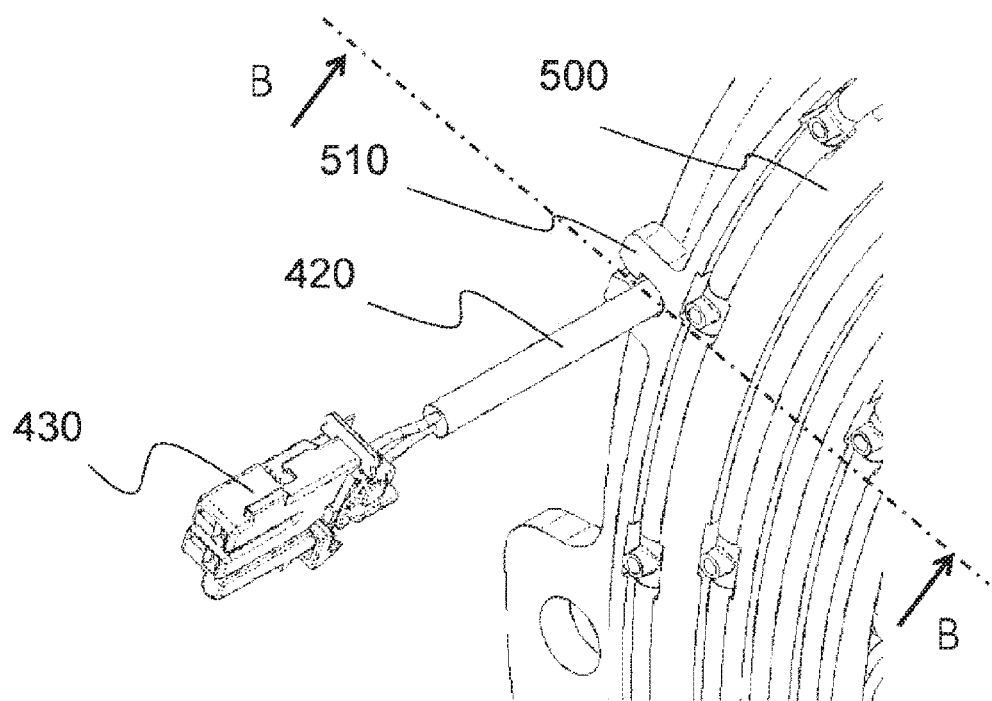
FIG. 5 is a view showing an attachment structure of a thermistor according to the one embodiment of the present invention.
Figure 6:
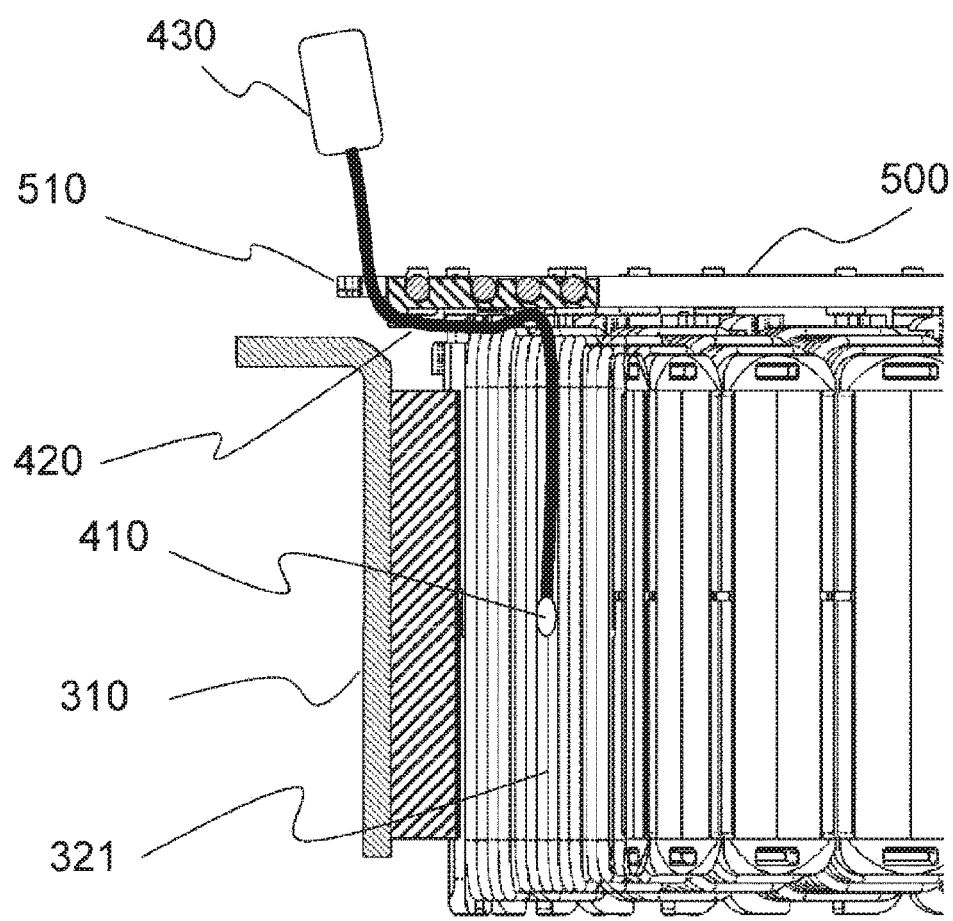
FIG. 6 is a view showing the attachment structure of the thermistor according to the one embodiment of the present invention.
Figure 7:
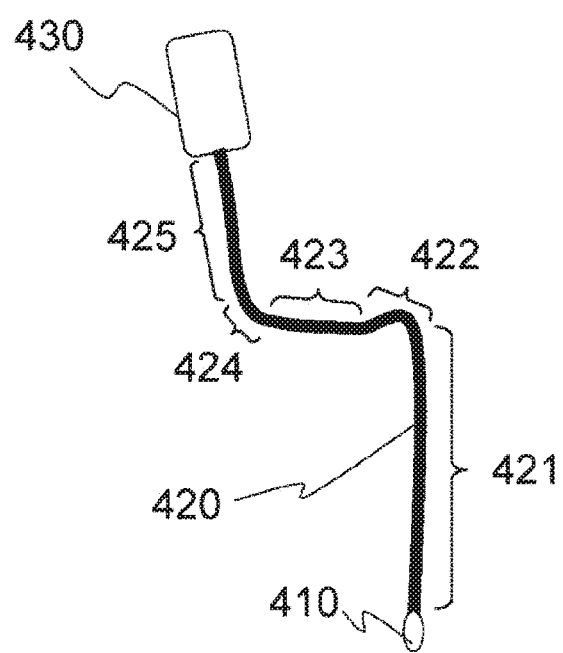
FIG. 7 is a view showing a bent state of a lead wire according to the one embodiment of the present invention.

FIGS. 5 and 6 are views each showing an attachment structure of the thermistor 400 according to the one embodiment of the present invention, while FIG. 7 is a view showing a bent state of the lead wire 420 according to the one embodiment of the present invention. Note that FIG. 6 is a cross-sectional view taken along a line B-B of FIG. 5, and that FIG. 7 is a view showing the thermistor 400 extracted from FIG. 6.

The attachment structure of the thermistor 400 according to the present embodiment is similar to the attachment structure of the comparative example described above in the point that the lead wire 420 extends from the semiconductor element 410, passes between the connection plate 500 and the axial ends of the concentrated winding coils 321, and is drawn out of the stator 300. Accordingly, the lead wire 420 extending in the axial direction of the stator 300 from the semiconductor element 410 is bent toward the outer circumferential side of the stator 300 in front of the connection plate 500. The bent lead wire 420 extends in the radial direction of the stator 300, passes between the connection plate 500 and the axial ends of the concentrated winding coils 321, and is drawn out of the stator 300. The semiconductor element 410 is inserted and disposed between the two concentrated winding coils 321.

According to the present embodiment, the lead wire 420 drawn out of the stator 300 is further bent in the axial direction of the stator 300 at a radial end of the connection plate 500. The lead wire 420 bent in the axial direction extends in the axial direction while passing through a hook 510 provided on the connection plate 500, and is connected to the connector 430.

As described above, the lead wire 420 has two bent portions between the semiconductor element 410 and the connector 430. More specifically, as shown in FIG. 7, the lead wire 420 includes a first extending portion 421 which extends in the axial direction of the stator 300 from one end connected to the semiconductor element 410, a first bent portion 422 bent in a direction toward the outer circumferential side of the stator 300 from the first extending portion 421, a second extending portion 423 extending in the radial direction of the stator 300 from the first bent portion 422, a second bent portion 424 bent in the axial direction of the stator 300 from the second extending portion 423, and a third extending portion 425 extending in the axial direction of the stator 300 from the second bent portion 424 and drawn out of the stator 300.

The third extending portion 425 of the respective portions of the lead wire 420 shown in FIG. 7 passes through the hook 510 provided on the connection plate 500, and is drawn out of the stator 300. As shown in FIGS. 5 and 6, the hook 510 has an inner diameter larger than a thickness of the lead wire 420, and functions as a guide mechanism for guiding the lead wire 420, that is, for holding the lead wire 420 in a movable state. Therefore, the extension direction of the third extending portion 425 of the lead wire 420 is limited to the axial direction of the stator 300 without fixation of the third extending portion 425 by the hook 510. In this manner, the bent state at the second bent portion 424 of the lead wire 420 is maintained regardless of a restoring force generated by elasticity of the lead wire 420. Note that the bent state at the first bent portion 422 of the lead wire 420 is maintained in a manner similar to that manner of the comparative example, i.e., by the configuration that the first extending portion 421 passes between the concentrated winding coils 321, and that the second extending portion 423 passes between the connection plate 500 and the axial ends of the concentrated winding coils 321.

Moreover, the second extending portion 423 passes between the connection plate 500 and the axial ends of the concentrated winding coils 321 and leads to the first extending portion 421 via the first bent portion 422. In this case, a force acts in such a manner as to press the first bent portion 422 in the axial direction (insertion direction of the semiconductor element 410) from the connection plate 500 in accordance with an elastic force of the lead wire 420.

In other words, the semiconductor element 410 is pressed by the connection plate 500 in the insertion direction via the lead wire 420.

As described above, according to the attachment structure of the thermistor 400 of the present embodiment, the lead wire 420 has a plurality of bent portions, and the semiconductor element 410 is pressed in the insertion direction. In this manner, even if the lead wire 420 connected to the connector 430 is pulled at the time of engagement between the connector 430 and a connector of an external circuit, a pulling force thus generated is absorbed by the elastic force of the lead wire 420 or a frictional force between the lead wire 420 and the connection plate 500. In this case, no force is applied in the direction where the semiconductor element 410 is pulled out from the position between the concentrated winding coils 321. Accordingly, a situation of separation of the thermistor 400 from the stator 300 as a result of pull-out of the semiconductor element 410 is avoidable without fixation of the semiconductor element 410. The thermistor 400 is therefore allowed to be securely attached to the rotating electric machine 100 without impairing workability during routing of the lead wire 420.

According to the one embodiment of the present invention described above, following operations and effects are offered.

(1) The rotating electric machine 100 includes the rotor 200, the stator 300 that includes the plurality of concentrated winding coils 321, the semiconductor element 410 that is a sensor element for detecting temperatures of the concentrated winding coil 321, the lead wire 420 connected to the semiconductor element 410, and the hook 510 that is a guide mechanism for regulating an extension direction of the lead wire 420. The semiconductor element 410 is inserted between the two concentrated winding coils 321 adjacent to each other in the plurality of concentrated winding coils 321. One end of the lead wire 420 is connected to the semiconductor element 410, while the other end of the lead wire 420 is drawn out of the stator 300. The lead wire 420 has a plurality of bent portions. The hook 510 regulates the extension direction of the lead wire 420 drawn out of the stator 300 such that a bent state of the bent portion of the lead wire 420 is maintained. This configuration prevents pull-out of the semiconductor element 410 from the stator 300 without fixation of the semiconductor element 410, and improves workability at the time of attachment of the semiconductor element 410 to the rotating electric machine 100.

(2) The lead wire 420 includes the first extending portion 421 which extends in the axial direction of the stator 300 from one end, the first bent portion 422 bent in a direction toward the outer circumferential side of the stator 300 from the first extending portion 421, the second extending portion 423 extending in the radial direction of the stator 300 from the first bent portion 422, the second bent portion 424 bent in the axial direction from the second extending portion 423, and the third extending portion 425 extending in the axial direction from the second bent portion 424 and drawn out of the stator 300. The hook 510 regulates the extension direction at the third extending portion 425 of the lead wire 420 such that the bent state at the second bent portion 424 of the lead wire 420 is maintained. This configuration can prevent application of a force in the direction of pull-out of the semiconductor element 410 from the position between the concentrated winding coils 321 as a result of pulling of the lead wire 420.

(3) The rotating electric machine 100 further includes the connection plate 500 that is a cover member provided on one axial end side of the stator 300. The first extending portion 421 of the lead wire 420 is disposed between the concentrated winding coils 321, while the second extending portion 423 is disposed between the concentrated winding coils 321 and the connection plate 500. This configuration allows absorption of a pulling force of the lead wire 420 by a frictional force between the lead wire 420 and the connection plate 500, thereby preventing application of a force in the direction of pull-out of the semiconductor element 410 from the position between the concentrated winding coils 321.

(4) The hook 510 is provided on the connection plate 500. Accordingly, the hook 510 provided on the rotating electric machine 100 does not cause the number of components to be increased.

(5) The hook 510 regulates the extension direction of the lead wire 420 by holding the lead wire 420 in a movable state. This configuration can maintain the bent state of the lead wire 420 while securing workability during attachment of the semiconductor element 410 to the rotating electric machine 100.

(6) The lead wire 420 has elasticity. This configuration can increase a frictional force generated between the lead wire 420 and the connection plate 500 at the time of pulling of the lead wire 420. Accordingly, a pulling force applied to the lead wire 420 can be effectively absorbed, and application of a force in the direction of pull-out of the semiconductor element 410 from the position between the concentrated winding coils 321 is avoidable.

(7) The semiconductor element 410 is pressed in the insertion direction via the lead wire 420. In other words, the lead wire 420 is pressed by the connection plate 500 in the insertion direction of the semiconductor element 410. This configuration can maintain the state of insertion of the semiconductor element 410 between the concentrated winding coils 321 without fixation of the semiconductor element 410.

According to the one embodiment of the present invention described above, the lead wire 420 has two bent portions. However, note that the lead wire 420 may have three or more bent portions. The present invention is applicable as long as the lead wire 420 has a plurality of bent portions between the semiconductor element 410 and the connector 430, and is allowed to maintain a bent state when the thermistor 400 is attached to the rotating electric machine 100.

Moreover, according to the one embodiment of the present invention described above, the hook 510 having an inner diameter larger than the thickness of the lead wire 420 is used as the guide mechanism of the lead wire 420. However, a guide mechanism having a different structure may be adopted. For example, a groove or the like disposed in the extension direction of the third extending portion 425 may be used. Alternatively, the lead wire 420 may be fixed and held using a snap mechanism or the like. Accordingly, any guide mechanism is applicable as long as the bent state of the lead wire 420 can be appropriately maintained.

According to the one embodiment of the present invention described above, the hook 510 functioning as the guide mechanism of the lead wire 420 is provided on the connection plate 500. However, the guide mechanism of the lead wire 420 may be constituted by a member different from the connection plate 500. Alternatively, in a case where the one axial end side of the concentrated winding stator 320 is covered by a cover member different from the connection plate 500, a guide mechanism of the lead wire 420 may be provided on this cover member.

The embodiment described above and various modifications are presented only by way of example. The present invention is not limited to these contents unless the features of the present invention are impaired. In addition, while various embodiments and modifications have been described above, the present invention is not limited to these contents. Other modes conceivable within the scope of the technical idea of the present invention are also included in the scope of the present invention.

REFERENCE SIGNS LIST 100 rotating electric machine
200 rotor
300 stator
310 housing 320 concentrated winding stator
321 concentrated winding coil
400 thermistor
410 semiconductor element
420 lead wire
421 first extending portion
422 first bent portion
423 second extending portion
424 second bent portion
425 third extending portion
430 connector
500 connection plate
510 hook

The invention claimed is:

1. A rotating electric machine comprising:
a rotor;
a stator that includes a plurality of coils connected via a cover member;
a sensor element that detects temperatures of the coils;
a lead wire connected to the sensor element; and
a guide mechanism attached to an outer circumferential edge of the cover member that regulates an extension direction of the lead wire,
wherein the sensor element is inserted between two adjacent coils of the plurality of coils,
one end of the lead wire is connected to the sensor element,
the other end of the lead wire is drawn out of the stator,
the lead wire has a plurality of bent portions, and
the guide mechanism regulates the extension direction of the lead wire drawn out of the stator such that a bent state of the bent portions of the lead wire is maintained.

2. The rotating electric machine according to claim 1, wherein
the lead wire includes
a first extending portion that extends in an axial direction of the stator from the one end,
a first bent portion that is bent in a direction toward an outer circumferential side of the stator from the first extending portion,
a second extending portion that extends in a radial direction of the stator from the first bent portion,
a second bent portion that is bent in the axial direction from the second extending portion, and
a third extending portion that extends in the axial direction from the second bent portion, and is drawn out of the stator, and
the guide mechanism regulates the extension direction at the third extending portion of the lead wire such that a bent state of the second bent portion of the lead wire is maintained.

3. The rotating electric machine according to claim 2, wherein
the cover member provided on one axial end side of the stator,
the first extending portion is disposed between the two coils, and
the second extending portion is disposed between the coils and the cover member.

4. The rotating electric machine according to claim 1, wherein the guide mechanism regulates the extension direction of the lead wire by holding the lead wire in a movable state.

5. The rotating electric machine according to claim 1, wherein the lead wire has elasticity.

6. The rotating electric machine according to claim 1, wherein the sensor element is pressed in an insertion direction via the lead wire.

7. The rotating electric machine according to claim 6, wherein the lead wire is pressed by the cover member in an insertion direction of the sensor element.

8. The rotating electric machine according to claim 1, wherein the sensor element is in contact with the two coils.

* * * * *